United States Patent [19]

Hubert et al.

[11] Patent Number: 4,960,152

[45] Date of Patent: Oct. 2, 1990

[54] DEVICE FOR COMPENSATING BY SUPPLYING A MEASURED AMOUNT OF FLUID AND ITS APPLICATION FOR REPLENISHING A HYDRAULIC CIRCUIT

[75] Inventors: Philippe Hubert, Lyons; Eric Martin, Villeurbanne, both of France

[73] Assignee: Novatome, Courbevoie, France

[21] Appl. No.: 348,529

[22] Filed: May 8, 1989

[30] Foreign Application Priority Data

May 6, 1988 [FR] France ................................ 88 06169

[51] Int. Cl.⁵ ........................ F16K 21/18; F16K 37/00
[52] U.S. Cl. ...................................... 137/559; 73/168; 116/276; 137/403
[58] Field of Search ........................ 73/168, 49.7, 308; 137/403, 404, 559

[56] References Cited

U.S. PATENT DOCUMENTS

| | | | |
|---|---|---|---|
| 776,727 | 12/1904 | Collar | 137/404 X |
| 2,551,380 | 5/1951 | Larsen | |
| 2,722,286 | 11/1955 | Lyttle | |
| 3,083,724 | 4/1963 | Johnson | 137/404 |
| 4,107,984 | 8/1978 | Dana | |
| 4,595,341 | 6/1986 | Castell-Evans | 73/308 X |

FOREIGN PATENT DOCUMENTS

| | | |
|---|---|---|
| 0141599 | 5/1985 | European Pat. Off. |
| 197572 | 2/1907 | Fed. Rep. of Germany |
| 448275 | 9/1912 | France |
| 900088 | 11/1943 | France |
| 1084884 | 9/1967 | United Kingdom |

Primary Examiner—Daniel M. Yasich
Attorney, Agent, or Firm—Pollock, Vande Sande & Priddy

[57] ABSTRACT

The device includes a main receptacle (1) having an overflow pipe (2) and a secondary receptacle (9) mounted so as to be freely movable in the vertical direction inside the main receptacle (1). The inner space of the secondary receptacle (9) communicates with a drainage pipe (8) for fluid lost by the hydraulic installation. The secondary receptacle (9) floats in the fluid contained in the main receptacle (1). The immersion level of the secondary receptacle (9) increases, depending on the amount of lost fluid received by the secondary receptacle (9), and the supply of fluid from the main receptacle (1) is caused by the immersion of the secondary receptacle (9).

6 Claims, 1 Drawing Sheet

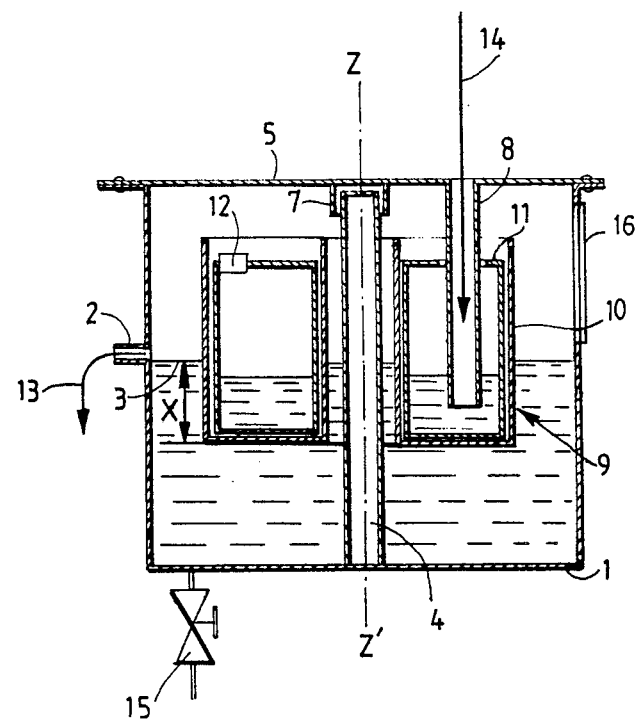

DEVICE FOR COMPENSATING BY SUPPLYING A MEASURED AMOUNT OF FLUID AND ITS APPLICATION FOR REPLENISHING A HYDRAULIC CIRCUIT

FIELD OF THE INVENTION

The invention relates to a device for compensating for fluid loss in an hydraulic installation, by supplying a measured amount of fluid from a main receptacle having an over-flow pipe and as a function of a quantity of fluid lost by a hydraulic installation, which may be a pump, a rotating machine which has a leakage, or an hydraulic circuit in which the total amount of fluid must be kept perfectly constant.

This is the case for example for pumps such as those used in nuclear reactors which leak at the packing seals of their rotating part. In this case, it is necessary to recover carefully the polluted oil emerging from the leak and to replace this polluted oil with an exactly equal or equivalent volume of new oil.

It is desirable to make good the loss of oil from the pump with new oil automatically, without having to stop the pump. Human intervention would in effect necessitate stopping the pump or more generally the hydraulic installation, which increases the periods of down time.

BACKGROUND OF THE INVENTION

Replenishing circuits may be used for this purpose, including means for evaluating the amount of oil in the pump and means for measuring and replenishing, bringing into play hydraulic and electro-hydraulic components such as pumps, valves and electric valves as well as measuring means such as flow-meters, level sensors or pressure sensors.

Such devices are complicated and their operation as well as their regulation can be difficult.

Until now, the prior art did not include a supply or pumping device of simple construction enabling the removal of an accurately measured amount of fluid from a receptacle, as a function of an amount of fluid lost by an hydraulic installation.

SUMMARY OF THE INVENTION

The object of the present invention is therefore to purpose a device for compensating fluid lost by an hydraulic installation by supplying a measured amount of fluid as a function of the lost fluid, the device being of simple construction and operation and totally automatic, and dispensing with hydraulic components such as valves, electric valves, regulating pumps or other components such as various sensors.

For this purpose, the device according to the invention includes a main receptacle having an overflow pipe and a secondary receptacle, mounted so as to be freely movable in the vertical direction inside the main receptacle, the inner space of which communicates with a drainage pipe for the fluid lost by the hydraulic installation, the secondary receptacle floating in the fluid contained in the main receptacle, being immersed in this fluid to a level dependent on the amount of lost fluid received by the secondary receptacle, and the supply via the overflow pipe of the fluid in the main receptacle being caused by immersion of the secondary receptacle.

BRIEF DESCRIPTION OF THE DRAWING

In order that the invention may be fully understood, an embodiment of the compensation device according to the invention will now be described with reference to the attached single drawing FIGURE, which is a sectional view of the supply device attached to the pump.

DESCRIPTION OF PREFERRED EMBODIMENT

The device represented in the drawing includes a main receptacle 1 having a drainage pipe 2 going through its wall and constituting an overflow pipe for a fluid contained in receptacle 1.

Receptacle 1 contains new oil of which the level 3 is established in accordance with the lower part of the drainage pipe 2. A vertical column 4 is fixed to the bottom of the receptacle 1 which is closed at its top by a lid 5 resting on the upper edge of the lateral wall of receptacle 1.

Under the lid 5 and in a central position is fixed a sleeve 7 which covers the upper part of the vertical column 4, thereby keeping it in place.

The lid 5 also supports a vertical tubular pipe 8 which passes through the lid.

Inside the receptacle 1 is fitted an assembly which is freely movable in the vertical direction, and which constitutes a secondary receptacle which collects the leakage oil from the pump by means of the pipe 8.

The secondary receptacle 9 is constituted by an outer floating receptacle 10 open at the top, itself containing a completely closed drainage receptacle 11 into which the pipe 8 loosely penetrates, putting the inner space of the receptacle 11 in communication with the leakage oil from the pump.

The outer floating receptacle 10 is loosely engaged by its hollow central part around the column 4, allowing displacement in a vertical direction. The drainage receptacle 11 is fixed inside the outer receptacle 10 and the pipe 8 is loosely inserted in the aperture through its wall, so that the whole secondary receptacle can be displaced in a vertical direction inside the main receptacle 1 without being able to turn around the vertical axis ZZ' of column 4 and receptacle 1.

The outer floating receptacle 10 which is immersed in the fluid filling the main receptacle 1 up to the level 3 constitutes a floating vessel supported by the fluid inside receptacle 1.

The inner drainage receptacle 11 has a plug 12 for emptying out the polluted oil coming from the pipe 8 and collected in this inner receptacle.

It is quite clear that the floating receptacle 10 is immersed, inside the fluid of receptacle 1, to a level X, dependent on the total mass of the floating receptacle and the amount of polluted oil collected in the drainage receptacle 11.

It is also quite clear that, when the floating receptacle 10 sinks down inside the fluid contained in receptacle 1, the level 3 tends to rise and fluid contained in this receptacle 1 flows out via the overflow pipe 2 (arrow 13).

The amount of new oil which flows out through the overflow pipe 2 is exactly equal or proportional to the amount of polluted oil coming into the drainage receptacle 11 via the pipe 8 (arrow 14).

The main receptacle 1 has an emptying valve 15 fitted at the bottom of the receptacle.

There will now be established the relationship existing between the volume V1 of fluid in the drainage receptacle (polluted oil) and the volume V2 of fluid flowing out via the overflow pipe 2 (new oil).

To establish a more general relationship, it will be assumed that the fluid flowing into the drainage receptacle 11 is different from the fluid contained in the main receptacle 1.

In the relationships given below, the following meanings are intended:

$\mu 1$: the volume mass of fluid which flows into the drainage receptacle 11

$\mu 2$: the volume mass of fluid contained in the main receptacle 1, g: the acceleration of gravity, M: total mass of floating receptacle 10 and of drainage receptacle 11, excluding mass of fluid, S1: the pressure surface of the floating receptacle 10, V1: the volume of fluid received in the drainage receptacle 11, V2: the volume of fluid poured out via the overflow pipe 2, X: the level of immersion of the secondary receptacle 9, i.e., the vertical distance between the bottom of the floating receptacle 10 and the level 3 of the overflow pipe 2.

The equality between the total weight of the secondary receptacle and the Archimedean pressure leads to the following relationship:

$$S1\mu 2gX = Mg + V1\mu 1g$$

i.e., $$S12X = M + V1\ 1$$

or also $$X = M/(S1\mu 2) + (V1\mu 1)/(S1\mu 2)$$

If the conditions initially selected correspond to the start-up of the pump, the drainage receptacle 11 being empty, these initial conditions can be expressed in the following way:

$$V1 = 0,$$

hence: $X = X0 = M/S1\mu 2$, X0 designating the initial immersion level.

When X1 designates the increase in the level of immersion as a result of the flow of fluid into the drainage receptacle 11, the following relationships can be established:

$$X = X0 + X1$$

where $$X = X0 + V1/S1 \times \mu 1/\mu 2$$

or also $$X1 = V1/S1 \times \mu 1/\mu 2.$$

The introduction of a volume of fluid V1 into the drainage receptacle 11 leads therefore to an immersion of the floating receptacle 10 to a level X1 given by the relationship indicated above.

The volume V2 of fluid of the main receptacle 1 which flows out via the overflow pipe 2 is therefore:

$$V2 = X1S1 = V1/S1\mu 1/\mu 2S1$$

or also $V2 = V1 \times \mu 1/\mu 2$

When $\mu 1 = \mu 2$ and in particular when the fluid flowing into the drainage vessel is the same as the replacement fluid of the main receptacle, then V1 = V2.

The volume of new oil flowing out via the overflow pipe 2 is therefore exactly the same as the volume of polluted oil drained off from the leaks of the pump.

It is therefore sufficient to introduce into the pump the amount V2 of replacement oil in order to keep the total amount of oil in the pump perfectly constant.

The device according to the invention therefore enables one of the safety constraints of pumping equipment to be totally respected, which constraint concerns maintaining a constant amount of lubricating fluid within the pumping equipment. It is in fact forbidden to add more lubricating fluid than the amount of used fluid which has been drained off.

It is possible to supply the lubricant directly to the pump from the overflow pipe 2, by drainage or backflow, this replenishing of the pump with lubricating oil being possible either continuously or in small doses with a slight time interval between two doses.

It is also possible to store a certain amount of new replacement oil and to force it back into the pump using an injection or pumping device.

The main receptacle contains, in its wall, a sealed graduated window 16 mounted laterally and enabling the position of the top of the secondary receptacle 9 to be located and therefore the immersion level X to be visually measured. In this way a relatively accurate measurement of the amounts of leakage oil drained off and the amount of new oil introduced into the pump can be obtained.

The replenishing of the pump with new oil can take place when the bottom of the floating receptacle 10 comes to rest on the bottom of the main receptacle 1. The height of the floating receptacle 10 is greater than the vertical distance between the bottom of the main receptacle 1 and the level 3 of the overflow pipe 2, so that in the bottom position of the floating receptacle 10, the new oil contained in the main receptacle 1 cannot enter the floating receptacle and as a consequence cannot come into contact with the polluted oil contained in the closed drainage receptacle 11.

The bottom position of the floating receptacle 10 can be indicated, for example, by use of a luminous signal emitted by an electrical contact attached to the floating receptacle 10.

The operation of the pump is then stopped and maintenance operations are carried out by taking off the lid 5 of the receptacle 1. The floating receptacle 10 remains in place inside the receptacle 1, only the drainage receptacle 11 being taken out in order to drain off the polluted oil by opening the plug 12.

The drainage receptacle 11 is then replaced inside the floating receptacle 10, the level of which is re-established, for example by opening a valve which connects the main receptacle with a replenishing circuit of new oil.

It should be noted that during the replacement of the polluted oil with new oil, the polluted oil flows into a closed receptacle and that in this way the operators responsible for the pumping equipment avoid any contact with this polluted oil, which may be dangerous to touch.

The replenishing with new oil is thus carried out in a totally automatic manner while the pump is operating.

The device according to the invention not only allows the polluted oil to be recovered but also allows the volume of leakage oil removed to be measured. The device also allows the volume of new oil, introduced into the pump in place of the used oil, to be determined.

The device also ensures the storing of new oil which can be used while the pump is operating. For this purpose, the capacity of the main receptacle and the capacity of the secondary receptacle should be calculated in such a way as to allow the operating of the machine for a sufficient length of time without human intervention.

The device, even though it is very simple and inexpensive, also enables any risk of an error in the dosage to be avoided.

The reliability of the device is very satisfactory since the use of devices for checking, controlling, regulating and measuring is avoided, as are all electro-mechanical means such as motor-pumps, electric gate-valves or flow-meters, which are liable to deteriorate or fail.

Since the device functions only by gravity, it does not require an energy source.

Moreover the device according to the invention requires only infrequent servicing, resulting in economies of time and replacement parts.

Receptacles of any form and of various structures can be used which ensure the mounting and guiding of the secondary receptacle inside the main receptacle.

The secondary receptacle can be made up of two parts (one floating receptacle and one drainage receptacle) as described above or of one part only, the floating receptacle and the drainage receptacle then being constituted by the same receptacle.

The fluid contained in the main receptacle can be the same as the fluid which is drained off or can be constituted by a different fluid. In this case, it is possible to replace a certain mass of the first fluid by an equal mass of the second fluid in the hydraulic equipment.

The device according to the invention, when combined with pumping equipment, can be linked to the pump in any manner so as to recover the leakages from the pump seals via the pipe 8 and so as to replenish the pump with new oil from the main receptacle, by means of the overflow pipe 2.

The invention can be applied to all cases where it is desired to compensate a loss of fluid in a hydraulic installation or to replenish any rotating machine with lubricant.

We claim:

1. Device for replacing in a controlled amount a first, used fluid lost by an hydraulic installation, by a second, new fluid, said device comprising
    (a) a main receptacle having an overflow pipe passing through a wall of said main receptacle at a predetermined level and containing said second, new fluid;
    (b) a secondary receptacle mounted on guiding means in said main receptacle so as to be freely movable in the vertical direction inside said main receptacle and to float in said second fluid contained in said main receptacle; and
    (c) a drainage pipe fed with said first fluid lost by said hydraulic installation, and communicating with inner space of said secondary receptacle, so that said secondary receptacle is fed through said drainage pipe with said first fluid and has an increasing mass and thus is immersed in said second fluid to an increasing depth, as a function of the amount of said first fluid lost by said hydraulic installation;
    (d) said second fluid overflowing through said overflow pipe when said secondary receptacle is immersed to an increasing depth in said second fluid contained in said main receptacle, being used to replace said first fluid lost by said hydraulic installation.

2. Device according to claim 1, wherein said secondary receptacle is constituted by an outer floating receptacle open at a top thereof and a closed inner drainage receptacle positioned inside said floating receptacle and communicating with said drainage pipe.

3. Device according to claim 1, wherein said secondary receptacle is positioned around a vertical column rigidly attached to said main receptacle.

4. Device according to claim 1, wherein said drainage pipe is a vertical pipe passing through an aperture in a wall of said secondary receptacle.

5. Device according to claim 1, wherein said main receptacle has a removable lid traversed by and supporting said drainage pipe.

6. Device according to claim 1, comprising a sealed transparent window in a window of said main receptacle, graduated so as to enable the position of an upper edge of said secondary receptacle to be located inside said main receptacle.

* * * * *